Oct. 22, 1935. A. W. SCHOOF 2,018,384
GAUGE
Filed Sept. 14, 1933
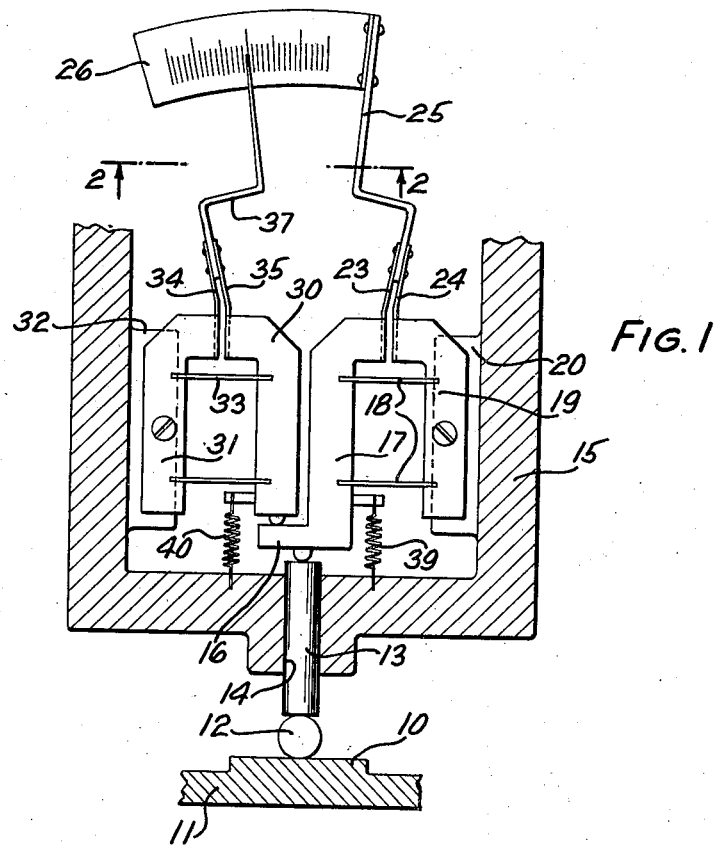
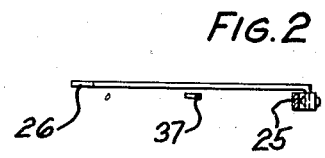
FIG. 2
INVENTOR
A. W. SCHOOF
BY H. A. Whitehorn
ATTORNEY Patented Oct. 22, 1935

2,018,384

UNITED STATES PATENT OFFICE 2,018,384

GAUGE

Arthur W. Schoof, Riverside, Ill., assignor to Western Electric Company, Incorporated, New York, N. Y., a corporation of New York Application September 14, 1933, Serial No. 689,367

5 Claims. (Cl. 33—147)

This invention relates to gauges and more particularly to those of the reed type.

An object of the invention is to increase the sensitivity of gauges used for measuring dimensions and similar properties.

In accordance with the object, one embodiment of the invention contemplates gauging apparatus comprising a work engaging member positioned to actuate simultaneously two movable gauging elements which in turn actuate respectively an index scale and a pointer in opposite directions, thereby with a given movement of the work engaging member multiplying the relative movement of the scale and pointer by two.

Other objects and advantages of the invention will be apparent from the following description taken in conjunction with the accompanying drawing, wherein Fig. 1 is a fragmentary vertical sectional view of the gauge, and Fig. 2 is a sectional view taken along the line 2—2 of Fig. 1.

Referring now to the drawing, numeral 10 designates a work support or anvil which is fixedly mounted on a suitable support 11 and arranged to support an article 12 being gauged. Above the work support 10 is a work engaging plunger 13 slidably disposed in a vertical aperture 14 in a casing 15, its lower end being positioned to engage the article 12, while its upper end is disposed in engagement with a horizontally extending lug 16 of a movable gauging element 17. The movable gauging element 17 is supported by parallel reeds 18, the ends of which are imbedded in or suitably secured to the movable gauging element 17 and a fixed element 19, respectively. A suitable lug 20 is formed on the wall of the casing 15 to which the fixed element 19 is rigidly secured. The upper ends of the elements 17 and 19 extend toward each other and have secured thereto resilient elements or reeds 23 and 24, respectively. The upper ends of the resilient elements 23 and 24 have positioned therebetween and fixed thereto the lower end of a scale arm 25, formed in general contour as shown in Fig. 1, and having fixed to its upper end an arcuately shaped scale or dial 26 provided on one surface thereof with suitable graduations.

The gauging unit just described is actuated by the gauging plunger 13 in response to the article 12 being gauged and when actuated imparts movement to the index scale 26. Another unit similar in construction to the gauging unit just described is also controlled by the actuation of the gauging plunger 13 for moving a pointer an equal distance in the opposite direction relative to the index scale 26. The gauging unit for actuating the pointer consists of a movable gauging element 30 having its lower end disposed in engagement with the horizontally extending lug 16 of the movable gauging element 17. A fixed element 31 is rigidly mounted upon a lug 32 carried by the inner wall of the casing 15 and is connected to the movable gauging element 30 by horizontally disposed reeds 33 which have their ends imbedded in or fixed to the elements 30 and 31.

The upper ends of the elements 30 and 31 extend toward each other and have secured thereto resilient elements or reeds 34 and 35, respectively, the upper ends of which have disposed therebetween and fixed thereto the lower end of a pointer 37, which is of the general contour shown in Fig. 1, and extends upwardly to a position adjacent the graduations upon the index scale 26. The movable gauging elements 17 and 30 are normally urged downwardly by biasing springs 39 and 40, respectively, to assure constant engagement of the movable gaging element 30 with the movable gauging element 17 and the movable gauging element 17 with the gauging plunger 13.

Upon considering the operation of the gauge, it will be observed that by placing an article 12 upon the work support 10, the gauging plunger 13 will be moved upwardly imparting an upper movement to the movable gauging element 17 and a like movement to the movable gauging element 30. Movement of the gauging element 17 relative to its gauging element 19 will cause the resilient element 23 to move the arm 25 with the index scale 26 through an arc to the right. The simultaneous movement of the gauging element 30 relative to its fixed gauging element 31 will cause movement of the resilient element 35 relative to the resilient element 34, resulting in an arcuate movement of the pointer to the left the same distance as the index scale is moved to the right.

With this construction, that is, with two gauging units responding to the movement of the gauging plunger, finer measurements may be obtained in view of the fact that both the index scale and the pointer are moved in opposite directions, making it possible to more readily observe and to determine the exact measurement of the article within minute fractions of an inch.

Although a specific embodiment of the invention has been described in detail hereinbefore, it is to be understood that other modifications and adaptations of the mechanism may be made without departing from the scope of the appended claims.

What is claimed is:

1. In a gauge, a work engaging plunger movable in response to work being gauged, two gauging units each comprising a movable element connected by parallel reeds to a fixed element and operatively associated with said plunger, a dial, means for operatively connecting one of said gauging units to said dial, a pointer, and means for operatively connecting the other of said gauging units to said pointer so that said dial and pointer may be moved in opposite directions relative to each other when said gauging plunger is moved.

2. In a gauge, a work engaging plunger movable in response to work being gauged, a movable gauging element disposed in engagement with said work engaging plunger, parallel reeds for supporting said movable gauging element, a dial, a resilient member connecting said movable gauging element to said dial, a second resilient element connecting said dial with a fixed support, a second movable gauging element, parallel reeds for supporting said second movable gauging element, a pointer having one end disposed adjacent said dial, a resilient element for connecting said pointer to said second movable gauging element, a resilient member for connecting said pointer to a fixed support, said second movable gauging element engaging said first movable gauging element so that movement of said gauging plunger will simultaneously move said gauging elements to move said dial and pointer in opposite directions.

3. In a gauge, a work engaging plunger movable in response to work being gauged, a dial, a pointer positioned adjacent said dial, gauge units, each comprising a movable gauging element connected to a fixed element by parallel reeds, for said dial and said pointer, parallel reeds for connecting said dial and said pointer to their respective gauge units, one of the movable gauging elements engaging said plunger and the other movable gauging element so that movement of the plunger will move said movable gauging elements to move said dial and pointer simultaneously in opposite directions.

4. In a gauge, a work engaging element movable in response to work being gauged, a movable dial resiliently mounted on a fixed portion of the gauge, a movable pointer resiliently mounted on a fixed portion of the gauge, and means operated by said work engaging element for moving said dial and pointer simultaneously in opposite directions.

5. In a gauge, a work engaging element movable in response to work being gauged, a dial, a flat spring carried by a fixed portion of the gauge for supporting said dial and for normally urging said dial into a predetermined position, a pointer, a flat spring carried by a fixed portion of the gauge for supporting said pointer and for normally urging said pointer into a predetermined position relative to said dial, and means actuated by said work engaging element for moving said dial and said pointer simultaneously in opposite directions against the forces of said flat springs.

ARTHUR W. SCHOOF.